US011509473B2

(12) United States Patent
Koziel et al.

(10) Patent No.: US 11,509,473 B2
(45) Date of Patent: Nov. 22, 2022

(54) ARCHITECTURE AND METHOD FOR HYBRID ISOGENY-BASED CRYPTOSYSTEMS

(71) Applicant: PQSecure Technologies, LLC, Boca Raton, FL (US)

(72) Inventors: Brian C. Koziel, Plano, TX (US); Rami El-Khatib, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 123 days.

(21) Appl. No.: 17/251,312

(22) PCT Filed: Jul. 20, 2020

(86) PCT No.: PCT/US2020/042816
§ 371 (c)(1),
(2) Date: Dec. 11, 2020

(87) PCT Pub. No.: WO2022/019886
PCT Pub. Date: Jan. 27, 2022

(65) Prior Publication Data
US 2022/0255742 A1   Aug. 11, 2022

(51) Int. Cl.
*H04L 9/30* (2006.01)
*H04L 9/14* (2006.01)

(52) U.S. Cl.
CPC .............. *H04L 9/3066* (2013.01); *H04L 9/14* (2013.01)

(58) Field of Classification Search
CPC ................................ H04L 9/3066; H04L 9/14
See application file for complete search history.

(56) References Cited

U.S. PATENT DOCUMENTS

| | | | | |
|---|---|---|---|---|
| 9,191,199 | B2 * | 11/2015 | Baldi | H04L 9/304 |
| 10,404,283 | B2 * | 9/2019 | Yang | H03M 13/6502 |
| 10,826,533 | B2 * | 11/2020 | Li | H03M 13/15 |
| 10,848,184 | B2 * | 11/2020 | Yang | H03M 13/1545 |
| 10,879,934 | B2 * | 12/2020 | Goettfert | H03M 13/1575 |
| 10,951,233 | B2 * | 3/2021 | Anderson | H03M 13/1111 |
| 10,971,242 | B2 * | 4/2021 | Huott | G11C 29/12 |
| 10,998,075 | B2 * | 5/2021 | Huott | G11C 11/4072 |
| 11,165,578 | B1 * | 11/2021 | Koziel | H04L 9/304 |

(Continued)

FOREIGN PATENT DOCUMENTS

| | | | | |
|---|---|---|---|---|
| WO | WO-2020036598 A1 * | 2/2020 | | G06F 7/724 |
| WO | WO2020036598 A1 | 2/2020 | | |

OTHER PUBLICATIONS

Brian et al.; "A high-performance and scalable hardware architecture for isogeny-based cryptography," vol. 67. (Year: 2018).*

(Continued)

*Primary Examiner* — Yonas A Bayou
(74) *Attorney, Agent, or Firm* — Mark C. Johnson; Johnson Dalal (57) ABSTRACT

At least one computer processor configured with a single prime field accelerator having software-based instructions operably configured to compute both isogeny-based cryptography equations and elliptic curve cryptography equations using a plurality of shared computations resident on a shared memory storage and that include finite field arithmetic and elliptic curve group arithmetic sequentially computed with an architecture controller.

11 Claims, 4 Drawing Sheets

(56) References Cited

U.S. PATENT DOCUMENTS

| | | | |
|---|---|---|---|
| 11,250,889 B2* | 2/2022 | Mirichigni | G06F 13/1668 |
| 2005/0094806 A1 | 5/2005 | Jao et al. | |
| 2005/0160316 A1* | 7/2005 | Shipton | B41J 2/04563 |
| | | | 714/22 |
| 2006/0195769 A1* | 8/2006 | Hassner | H03M 13/151 |
| | | | 714/785 |
| 2013/0326315 A1* | 12/2013 | Elia | G06F 7/724 |
| | | | 714/752 |
| 2014/0105386 A1 | 4/2014 | Lauter et al. | |

OTHER PUBLICATIONS

Brian et al.; "Post-quantum cryptography on FPGA based on isogenies on Elliptic curves" vol. 64. (Year: 2017).*

Gustavo et al.; "Faster key compression for isogeny-based cryptosystems.", vol. 68. (Year: 2019).*

Banerjee et al. "An energy-efficient reconfigurable DTLS cryptographic engine for End-to-End security in IoT applications." in: 2018 IEEE International Solid-States Circuits Conference—(ISSCC). Feb. 2018 (Feb. 2018).

Kim et al. "New hybrid method for isogeny-based cryptosystems using Edwards curves." In: IEEE Transactions on Information Theory. Sep. 2, 2019 (Sep. 2, 2019).

* cited by examiner

ARCHITECTURE AND METHOD FOR HYBRID ISOGENY-BASED CRYPTOSYSTEMS

FIELD OF THE INVENTION

The present invention relates generally to hardware, systems, and methods directed towards isogeny-based and elliptic curve cryptosystems, and, more particularly, relates to efficiently performing computations that are shared by isogeny-based cryptography and elliptic curve cryptography.

BACKGROUND OF THE INVENTION

Cryptology is the practice and study of techniques for secure communication in the presence of third parties called adversaries. More generally, cryptography is about constructing and analyzing protocols that prevent third parties or the public from reading private messages and includes various aspects in information security such as data confidentiality, data integrity, authentication, and non-repudiation. Applications of cryptography include electronic commerce, chip-based payment cards, digital currencies, computer passwords, and military communications. Cryptosystems are a suite of cryptographic algorithms needed to implement a particular security service, most commonly for achieving confidentiality. Due to the typical amount and time of computations required for a cryptography session, namely one utilizing post-quantum cryptography, the hardware or processing footprint is quite expensive. As such, utilizing such methods and systems is made impossible or commercially impracticable when desired for use in smaller devices, such as IoT devices.

Notably, these post-quantum cryptosystems must be vetted for acceptance in the cryptographic community. Post-quantum cryptosystems are by no means as efficient as classical computing cryptosystems. They require large amounts of communication and expensive computations. A large focus of the current research is to only accelerate new and novel post-quantum cryptosystems. However, to deploy such cryptosystems, the IoT device must also support several current cryptosystems to gradually transition to post-quantum cryptosystems. Because there are expensive computations in post-quantum cryptography, one method to reduce the footprint of such a device utilizing post-quantum accelerators is to have the post-quantum accelerator also accelerate classical cryptography computations if similar computations exist.

Therefore, a need exists to overcome the problems with the prior art as discussed above.

SUMMARY OF THE INVENTION

The invention provides a hardware, system, and method for efficiently implementing isogeny and elliptic curve cryptosystems utilizing hard problems involving isogenies and elliptic curve scalar point multiplication, respectively. At the lowest level, elliptic curve and isogeny-based cryptosystems involve finite-field arithmetic, such as addition or multiplication modulo a large prime number. By cleverly choosing an efficient prime number, base elliptic curve for isogeny-based cryptography, and base elliptic curve for elliptic curve cryptography, we can reuse a prime field accelerator that greatly reduces the time, area, power, and energy of a simultaneous isogeny and elliptic curve implementation.

One level higher, isogeny of elliptic curves is one such instantiation of isogeny-based cryptography that utilizes elliptic curve group operations, such as point addition or scalar point multiplication, that is also utilized by elliptic curve cryptosystems. Another vision of this invention is such a design where a single elliptic curve operation accelerator is used for both an isogeny-based cryptosystem and elliptic curve cryptosystem.

With the foregoing and other objects in view, there is provided, in accordance with the invention, a computer processing system for utilizing hard problems of isogenies as well as hard problems of elliptic curves having at least one prime field accelerator with a memory storage unit and a controller. Another instantiation of this invention is a computer processing system for utilizing hard problems of isogenies on elliptic curves as well as hard problems of elliptic curves having at least one prime field accelerator with a memory storage unit and a controller.

In accordance with a further feature of the present invention, the prime field accelerator is a computer processor effectively computing any prime field arithmetic, including addition, subtraction, multiplication, inversion, and square root computations modulo a large prime.

In accordance with another feature, an embodiment of the present invention includes an elliptic curve accelerator which is a computer processor effectively computing an elliptic curve point addition, doubling, halving, subtraction, scalar point multiplication, or scalar point division in a large elliptic curve group defined over a large prime.

In accordance with yet another feature, the present invention includes a memory storage unit. This is some means of memory storage for intermediate values in isogeny-based cryptography and elliptic curve cryptography, potentially stored in the same manner.

In accordance with an additional feature, the controller is a method by which a computer processing unit can sequentially compute multiple prime field or elliptic curve operations to carry out an entire protocol in a cryptosystem.

Although the invention is illustrated and described herein as embodied in a system and method for reducing the processing footprint in simultaneous deployment of isogeny and elliptic curve cryptosystems, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
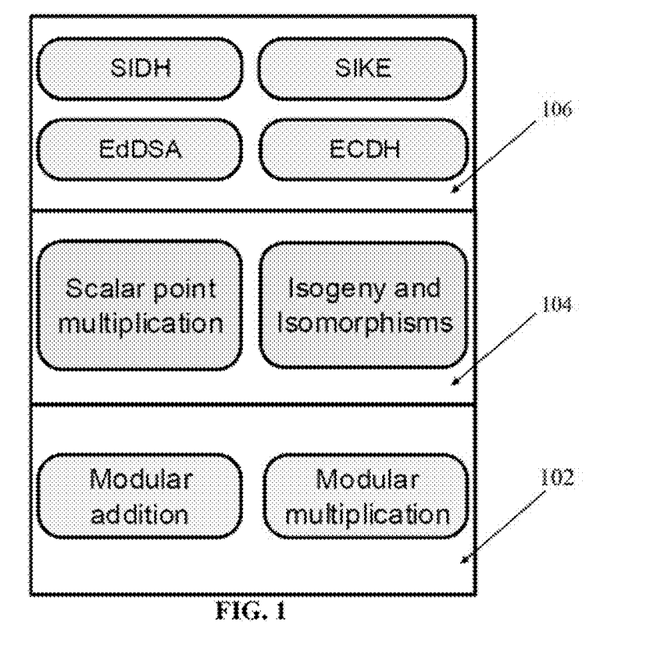
FIG. 1 is a schematic diagram depicting hierarchy of computations utilized in isogeny-based cryptography and elliptic curve cryptography in accordance with one embodiment of the present invention.

The present invention provides a novel and efficient hardware, system, and method solution that is operably configured to implement cryptosystems based on isogenies as well as cryptosystems based on elliptic curves. More specifically, by using a shared accelerator for low-level computations that are shared in these two types of cryptosystems, we can efficiently implement both cryptosystems. An accelerator may be a processing device or processor specifically configured to perform computationally intensive cryptographic operations. As is shown in FIG. 1, there are shared computations that are native to both isogeny-based cryptography and elliptic curve cryptography.

However, in order to effectively reuse computation accelerators in both cryptosystems, specific parameters must be selected so that the underlying cryptographic problem is hard. The spirit of this invention is that good choices of public key parameters allow one to reuse a single computation accelerator for both isogeny-based cryptosystems and elliptic curve-based cryptosystems. Specifically, the shared use of finite field arithmetic 102 (possibly referred to as "low level") and elliptic curve group arithmetic 104 (possibly referred to as "mid level"). The finite field computations or computations 102 may include modular addition and modular multiplication as seen in FIG. 1 and as further expanded upon herein. The elliptic curve group arithmetic or computations 104 may include scalar point multiplication and isogeny and isomorphisms as seen in FIG. 1 and as further expanded upon herein. Further, the elliptic curve computations/isogeny-based protocols 106 (possibly referred to as "top level") depicted in the schematic diagram depicting hierarchy of computations may include SIDH, SIKE, EdDSA, and ECDH Public-key cryptography is the study of exchanging secrets over an insecure public channel. By using hard problems such as the discrete logarithm problem or isogeny problem, data confidentiality, data integrity, authentication, and non-repudiation can be achieved. Given today's technology and future advances, the computational infeasibility of these hard problems means that it will be thousands or many orders of magnitudes of years to break the cryptosystem. The primary cryptosystem primitives we describe in the following are public key exchange, whereby two parties agree on a shared secret over an insecure channel and digital signature where one party digitally signs content with his private key and any other party can digitally verify this signed content with the public key associated with the signer's private key. Other primitives exist, such as authenticated key exchange, public key encryption, and zeroknowledge proofs. In the following, we will describe an instantiation of our invention given known isogeny and elliptic curve cryptosystems. The spirit of the invention is not limited to such an example but expands to any future simultaneous deployment of isogeny and elliptic curve cryptosystems.

Isogeny-based cryptography is cryptography based on isogenies, or algebraic morphisms that are surjective and have a finite kernel, among a group. In modern-day cryptography, isogenies on elliptic curve groups is thought to be a hard problem, even for quantum computers. As those of skill in the art will appreciate, an isogeny on elliptic curves $\varphi: E_1 \rightarrow E_2$ is a non-rational map of all points on $E_1$ to $E_2$ that preserves the point at infinity. Given a finite kernel and $E_1$, it is simple to compute $E_2$, the isogeny of $E_1$ using the finite kernel. However, given only $E_1$ and $E_2$, it is a computationally intensive task to compute the finite kernel used for the isogeny from $E_1$ to $E_2$, which is the foundation of isogeny-based cryptography. Some examples of isogeny-based cryptography include, but not limited to, the supersingular isogeny Diffie-Hellman ("SIDH") key exchange protocol, commutative supersingular isogeny Diffie-Hellman ("CSIDH") key exchange protocol, supersingular isogeny key encapsulation ("SIKE") mechanism, and SeaSign isogeny signatures. Each of these are isogeny-based cryptosystems that are based on the hardness of isogenies on elliptic curves. The cryptosystem parameters differ in many ways. However, efficient implementation of these cryptosystems depends on wise choices of prime field $F_q$ and elliptic curve E defined over $F_q$.

One embodiment of this invention is an SIDH implementation that is used for key establishment. As those skilled in the art will appreciate, SIDH utilizes mappings from a base elliptic curve $E_0$ defined over $F_{p^2}$, where p is a large prime number, to a final curve $E_{ss}$ where the curve's j-invariant is used as a shared secret. For efficient implementation of SIDH, it is generally recommended that p is of the form $p=fl_a^{e_a}l_b^{e_b}\pm1$, where $l_a$ and $l_b$ are small primes, usually, for example, $l_a=2$, $l_b=3$, $l_a^{e_a}l_b^{e_b}$, and f is a small cofactor, usually f=1, to make the number prime. This prime shape and choice of supersingular curve $E_0$ allows efficient chaining of small isogenies of degree 2 and 3 as the cardinality of the curve is $\#E_0=(fl_a^{e_a}l_b^{e_b})^2$. The full implementation of isogeny arithmetic in SIDH requires a mixture of finite field operations that compose elliptic curve and isogeny group operations.

Elliptic curve cryptography is cryptography based on the hardness of the elliptic curve discrete logarithm problem. Roughly, given an elliptic curve E defined over a prime field $F_p$, point $P \in E$, and scalar k, it is simple to compute the scalar point multiplication Q=kP. However, given only P, $Q \in E$, it is difficult to find the scalar that generated Q. Here, one elliptic curve is used as a basis for a number of elliptic curve group operations. Elliptic curve cryptography can be defined over either a binary finite field or prime finite field. Like isogeny-based cryptography, the choice of underlying finite field and elliptic curve can greatly reduce or increase the efficiency of an elliptic curve cryptosystem implementation. Furthermore, there are various parameters of the elliptic curve that can influence the hardness of the elliptic curve discrete logarithm problem. Some examples of elliptic curve cryptography primitives include, but not limited to, elliptic curve Diffie-Hellman ("ECDH"), elliptic curve digital signature algorithm ("ECDSA"), Edwards curve digital signature algorithm ("EdDSA"), and elliptic curve password authenticated key exchange by juggling ("ECJPAKE").

Considering this, wise choices of prime field and elliptic curves can be used to simultaneously implement both isogeny on elliptic curves and elliptic curve cryptography securely. In the following, we demonstrate an instantiation of this invention with two examples. In the first example, we introduce parameters for simultaneous implementation of SIDH and ECDH. In the second example, we introduce parameters for simultaneous implementation of SIDH and EdDSA.

In the choice of SIDH parameters, the choice of prime p is necessary for smooth evaluation of isogenies of a small degree. This prime must be of the form $p=fl_a^{e_a}l_b^{e_b}\pm1$ or else the performance will greatly suffer. In this example, we consider the 434-bit prime $p_{434}=2^{216}3^{137}-1$. For SIDH, we can define a base curve over this prime field as the Montgomery supersingular elliptic curve $y^2=x^3+6x^2+x$. This starting curve has a j-invariant equal to 287496. Given these parameters, we can implement efficient accelerators at the prime field (FIG. 2) or elliptic curve group operation (FIG. 3) level.

Given the isogeny on elliptic curve parameters, an efficient choice of elliptic curve can be defined that uses the same prime field and elliptic curve group operation accelerator. As those knowledgeable in the art will appreciate, the elliptic curve used for SIDH is weak to discrete-logarithm attacks such as the Pohlig-Hellman algorithm. Instead of a supersingular elliptic curve, an ordinary curve over $F_p$ can be chosen such that the elliptic curve has a hard elliptic curve discrete logarithm problem. One such curve is the Montgomery elliptic curve $y^2=x^3+439322x^2+x$ defined over $F_p$. There are a number of strengths to this curve. Notably, the cardinality of this curve and any twist is 4*n, where n is a large prime number. Also a security strength, the Pollard Rho attack on this elliptic curve would take approximately $2^{214.9}$ operations. For efficiency, this curve is defined over Montgomery curves which is useful for ECDH operations as the efficient and simple Montgomery ladder can be used. Furthermore, the curve coefficient A=439322 was chosen such that the value $$A_{24} = \frac{A+2}{4} = 109831$$

is also small as it is used in the Montgomery ladder. This is only a small listing of the benefits of this curve as those familiar with the art can appreciate.

The above Montgomery curve can be used in ECDH such as by the methods defined in RFC 7748. Here, we choose the point (u,v)=(0x4,0xc4dd1c159565600641e9b2cb3b1-02229afb64318044a6ffcbc6545c24 0665b0fd59985cd03e-9a130afb8291825436f66c69f73c6251d), which has a prime order. Similar to the methods for X25519 and X448 in RFC 7748, we can generate a private key by gathering 55 bytes of random data, clearing bits 0, 1, 434, 435, 436, 437, 438, and 439, and setting bit 433 for a pruned private key k. We then use this private key with the Montgomery ladder to generate a public key. In the second round, we again apply this private key and Montgomery ladder to the other party's public key to compute a shared secret for key establishment.

Another example is applying the same prime to an EdDSA cryptosystem to digitally sign and verify messages. Here, we use an Edwards curve with similar properties as the defined Montgomery curve for ECDH and apply the methodology of EdDSA as defined in RFC 8032. One such example is the twisted Edwards elliptic curve $x^2+y^2=1+109831x^2y^2$, also defined over $p_{434}=2^{216}3^{137-1}$. This elliptic curve features the smallest d coefficient where the cardinality of the curve and any twist is 4*n, where n is a large prime number. Without going into many details, we again use efficient elliptic curve operations to carry out the EdDSA protocol, this time over an Edwards curve.

The computations in both examples can be broken down into arithmetic over a prime field $F_q$, or arithmetic modulo a prime field q. In the SIDH example, $q=p^2$ and ECDH/EdDSA both use q=p. In both cases, we can reuse a finite field accelerator that computes various operations modulo p for both SIDH and ECDH/EdDSA. Thus, we can reuse the finite field accelerator between implementations (FIG. 2).

At the next level, both examples utilize group actions over elliptic curves. For instance, both SIDH and ECDH utilize scalar point multiplications over Montgomery curves. Although the base curve is not the same, the Montgomery curve point multiplication is the same in both cases. Thus, we can reuse the elliptic curve group accelerator between implementations (FIG. 3).

Figure 2:
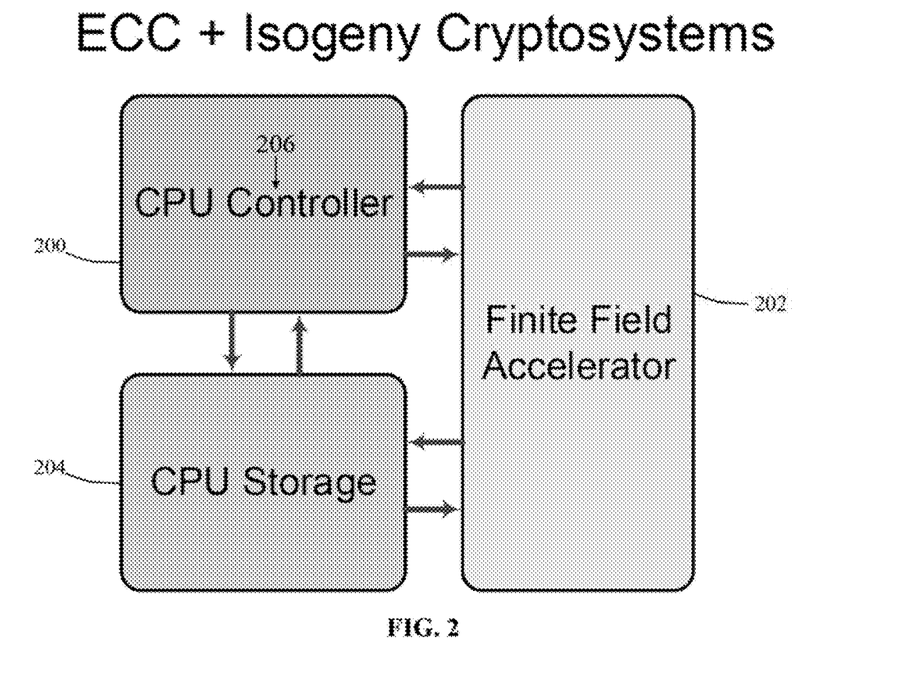
FIG. 2 is a schematic diagram depicting an instantiated form of the invention where an isogeny and elliptic curve computer processor share a prime or finite field accelerator, storage, and controller in accordance with one embodiment of the present invention.
Figure 3:
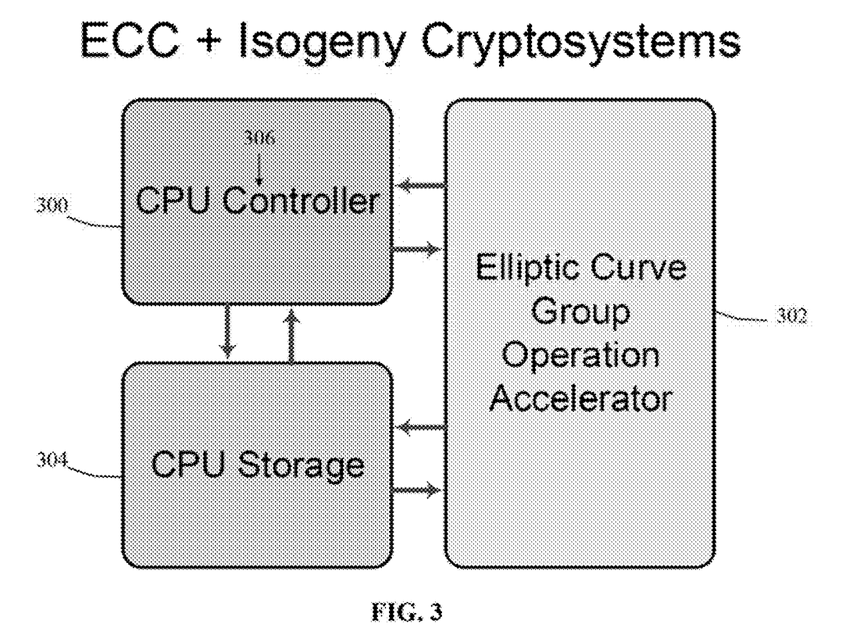
FIG. 3 is a schematic diagram depicting an instantiated form of the invention where an isogeny and elliptic curve computer processor share an elliptic curve group operation accelerator, storage, and controller in accordance with one embodiment of the present invention.

As such, the FIGS. 1-3 can be seen depicting at least one computer processor (e.g., processors 200, 300) configured as a one prime field accelerator (e.g., accelerators 202, 302) having software-based instructions operably configured to compute both isogeny-based cryptography equations and elliptic curve cryptography equations using a plurality of shared computations resident on a shared memory storage (e.g., memories 204, 304) and that include finite field arithmetic and elliptic curve group arithmetic 102, 104 sequentially computed with an architecture controller (e.g., controllers 206, 306). Said another way, an accelerator desired to make computations extremely fast. For finite fields, the accelerator makes finite field computations (such as addition or multiplication) really fast. In some cases, however, the finite field accelerator only operates over a single prime field, so the present invention targets places where the same prime field is used for elliptic and isogeny computations.

Figure 4:
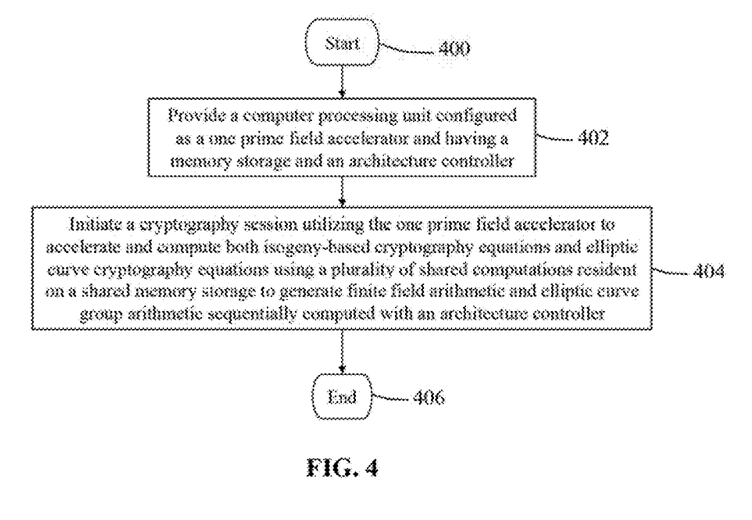
FIG. 4 depicts a process flow diagram of a method for implementing both isogeny-based and elliptic curve cryptography equations in a computer processing cryptosystem in accordance with one embodiment of the present invention.

A method for implementing both isogeny-based and elliptic curve cryptography equations in a computer processing cryptosystem has also been disclosed herein and can be gleaned from the figures. More specifically, and with reference to FIG. 4, the process may begin with step 400 and immediately proceed to the step 402 of providing at least one computer processor configured as one prime field accelerator having software-based instructions operably configured to compute both isogeny-based cryptography equations and elliptic curve cryptography equations and providing a shared memory storage and an architecture controller. Next, the process may include step 404 of initiating, through the least one computer processor, a cryptography session that includes utilizing the one prime field accelerator to accelerate (i.e., a specialized accelerator that requires generally far less power, time, etc., to compute the computation) and compute both isogeny-based cryptography equations and elliptic curve cryptography equations using a plurality of shared computations resident on the shared memory storage to generate finite field arithmetic and elliptic curve group arithmetic sequentially computed with the architecture controller. Said another way, the one prime field accelerator may include a finite field accelerator and/or a curve group operation accelerator. As such, an accelerator may be utilized for prime fields and issue a variety of operations over that. In another embodiment, an accelerator for elliptic curve operations may be utilized and again issue a variety of operations over that. Depending on the system in question, however, both a finite field and an elliptic curve accelerator could be utilized. The process may conclude in step 406.

Although a specific order of executing the process steps has been described, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps included can be combined into a single process.

What is claimed is:

1. A computer processing cryptosystem comprising:
   at least one computer processor configured as a one prime field accelerator having software-based computer readable instructions operably configured to compute, with the at least one computer processor, both isogeny-based cryptography equations and elliptic curve cryptography equations using a plurality of shared computations resident on a shared memory storage and that include finite field arithmetic and elliptic curve group arithmetic sequentially computed with an architecture controller.

2. The computer processing system according to claim 1, wherein the one prime field accelerator further comprises:
   at least one of a finite field accelerator or a curve group operation accelerator.

3. The computer processing system according to claim 1, wherein the one prime field accelerator is operably configured to compute equations over a prime field $p=2^{216}3^{137}-1$ for isogenies and elliptic curves.

4. The computer processing system according to claim 3, further comprising:
   at least one of the following equations utilized in its isomorphism class for at least one of elliptic curves:

$y^2=x^3+326750x^2+x;$ $y^2=x^3+439322x^2+x;$ $x^2+y^2=1+109831x^2y^2;$ $x^2+y^2=1-109830x^2y^2;$ $x^2+y^2=1+81688x^2y^2;$ $x^2+y^2=1-81687x^2y^2;$ $-x^2+y^2=1+109830x^2y^2;$ $-x^2+y^2=1-109831x^2y^2;$ $-x^2+y^2=1+81687x^2y^2;$ and $-x^2+y^2=1-81688x^2y^2.$ 5. The computer processing system according to claim 1, wherein the one prime field accelerator is operably configured to compute equations over a prime field $p=2^{250}3^{259}-1$ for isogenies and elliptic curves.

6. The computer processing system according to claim 5, further comprising:
   at least one of the following equations utilized in its isomorphism class for at least one of elliptic curves:

$y^2=x^3+308290x^2+x;$ $y^2=x^3+941678x^2+x;$ $x^2+y^2=1+77073x^2y^2;$ $x^2+y^2=1-77072x^2y^2;$ $x^2+y^2=1+235420x^2y^2;$ $x^2+y^2=1-235419x^2y^2;$ $-x^2+y^2=1+77072x^2y^2;$ $-x^2+y^2=1-77073x^2y^2;$ $-x^2+y^2=1+235419x^2y^2;$ and $-x^2+y^2=1-235420x^2y^2.$ 7. The computer processing system according to claim 1, wherein the one prime field accelerator is operably configured to compute equations over a prime field $p=2^{305}3^{192}-1$ for isogenies and elliptic curves.

8. The computer processing system according to claim 6, further comprising:
at least one of the following equations utilized in its isomorphism class for at least one of elliptic curves:

$y^2=x^3+1135802x^2+x;$ $y^2=x^3+975094x^2+x;$ $x^2+y^2=1+283951x^2y^2;$ $x^2+y^2=1-283950x^2y^2;$ $x^2+y^2=1+243774x^2y^2;$ $x^2+y^2=1-243773x^2y^2;$ $-x^2+y^2=1+283950x^2y^2;$ $-x^2+y^2=1-283951x^2y^2;$ $-x^2+y^2=1+243773x^2y^2;$ and $-x^2+y^2=1-243774x^2y^2.$ 9. The computer processing system according to claim 1, wherein the one prime field accelerator is operably configured to compute equations over a prime field $p=2^{372}3^{239}-1$ for isogenies and elliptic curves.

10. The computer processing system according to claim 9, further comprising:
at least one of the following equations utilized in its isomorphism class for at least one of elliptic curves:

$y^2=x^3+749726x^2+x;$ $y^2=x^3+624450x^2+x;$ $x^2+y^2=1+156113x^2y^2$ $x^2+y^2=1-156112x^2y^2;$ $x^2+y^2=1+187432x^2y^2;$ $x^2+y^2=1-187431x^2y^2;$ $-x^2+y^2=1+156112x^2y^2;$ $-y^2=1-156113x^2y^2;$ $-x^2+y^2=1+187431x^2y^2;$ and $-x^2+y^2=1-187432x^2y^2.$ 11. A computer-implemented method for implementing both isogeny-based and elliptic curve cryptography equations in a computer processing cryptosystem comprising the steps of:
providing at least one hardware computer processor configured as one prime field accelerator having software-based computer readable instructions operably configured to compute, with the at least one hardware computer processor, both isogeny-based cryptography equations and elliptic curve cryptography equations and providing a shared memory storage and an architecture controller; and
initiating, through the least one hardware computer processor, a cryptography session that includes:
utilizing the one prime field accelerator to accelerate and compute both isogeny-based cryptography equations and elliptic curve cryptography equations using a plurality of shared computations resident on the shared memory storage to generate finite field arithmetic and elliptic curve group arithmetic sequentially computed with the architecture controller.

* * * * *